March 30, 1965 R. V. MATHERS 3,175,707
AUTOMATIC FOLD-UP DEVICE FOR DROP LEAF TAILGATE
Filed March 22, 1962 4 Sheets-Sheet 1

INVENTOR
ROBERT V. MATHERS

BY
ATTORNEYS

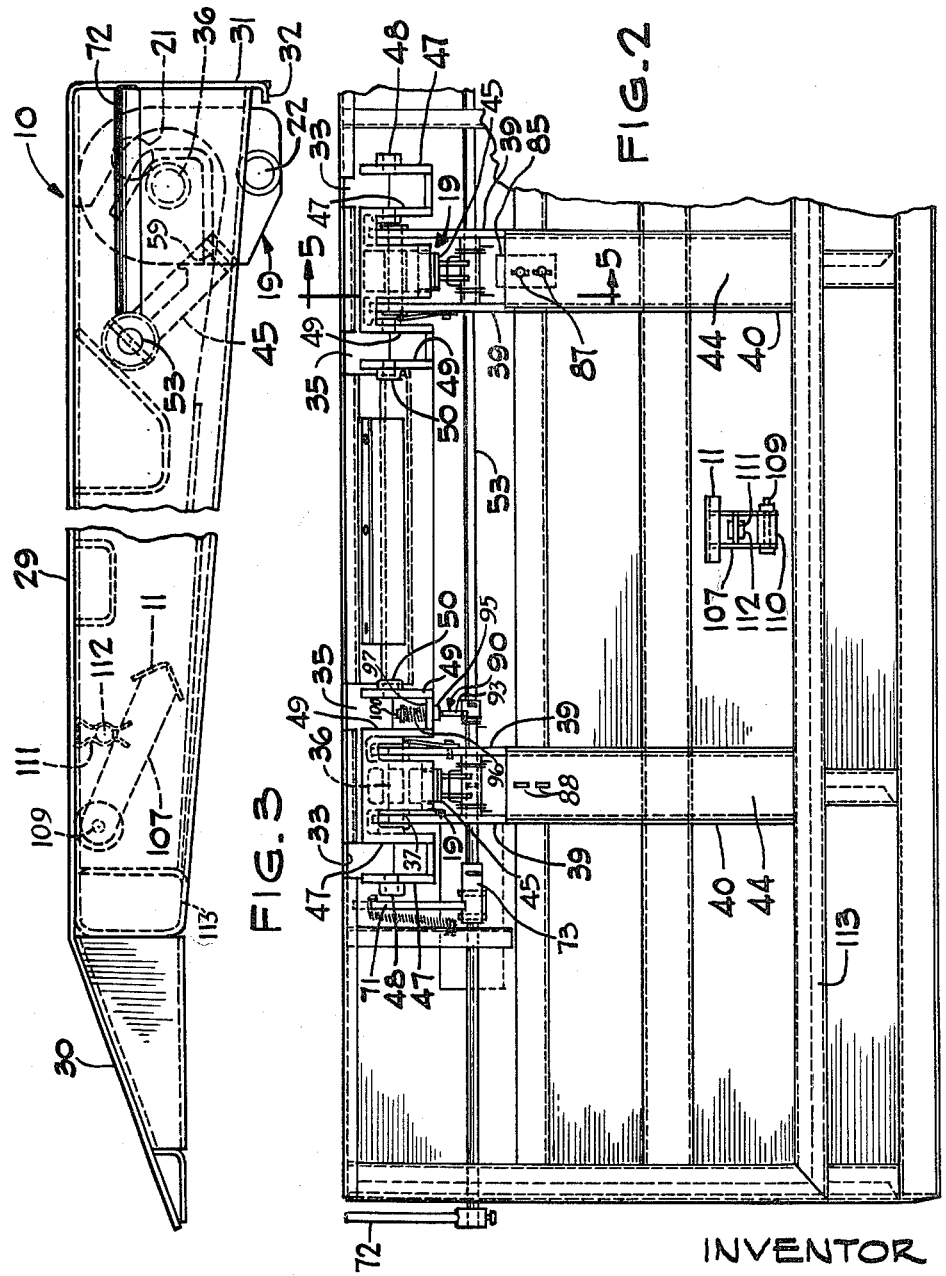

March 30, 1965  R. V. MATHERS  3,175,707
AUTOMATIC FOLD-UP DEVICE FOR DROP LEAF TAILGATE
Filed March 22, 1962  4 Sheets-Sheet 3

INVENTOR
ROBERT V. MATHERS

BY
ATTORNEYS

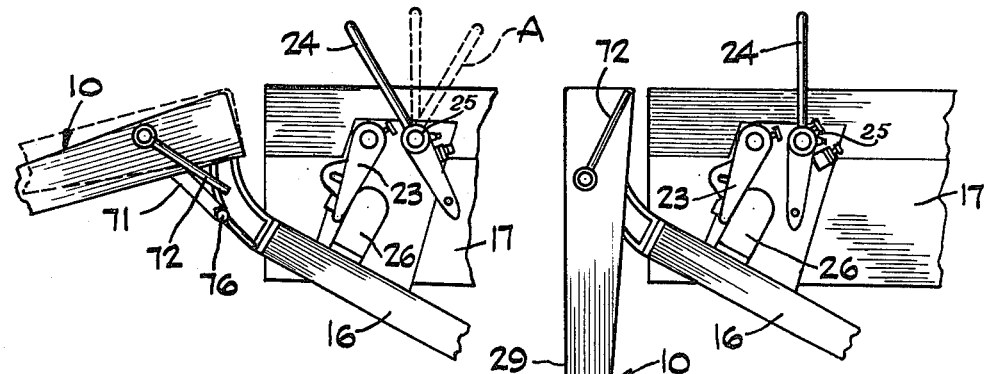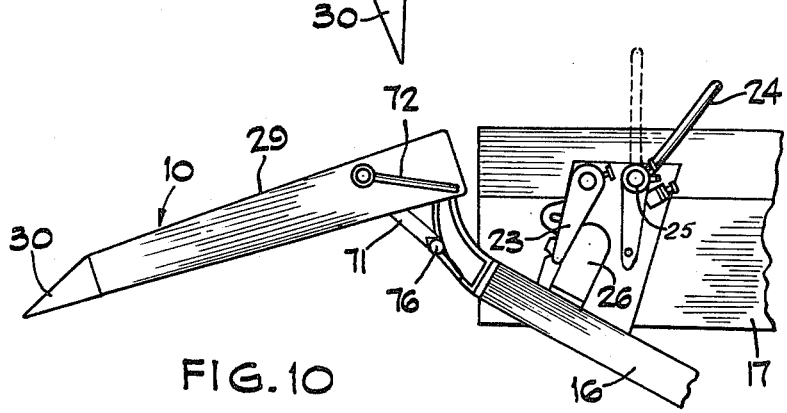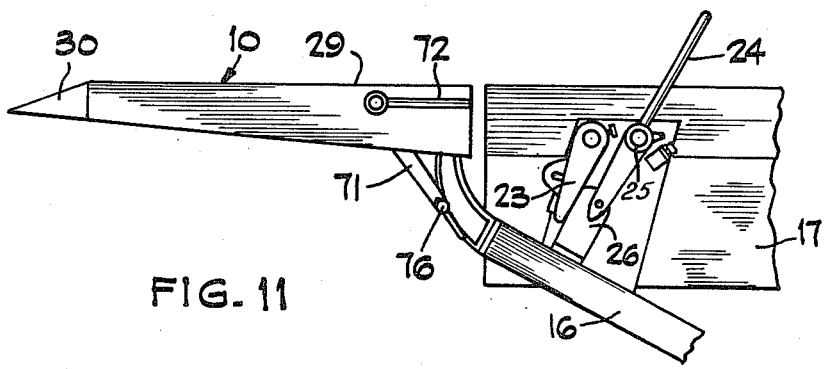

United States Patent Office 3,175,707
Patented Mar. 30, 1965

3,175,707
AUTOMATIC FOLD-UP DEVICE FOR
DROP LEAF TAILGATE
Robert V. Mathers, Streator, Ill., assignor to Anthony
Company, Streator, Ill., a corporation of Illinois
Filed Mar. 22, 1962, Ser. No. 181,625
13 Claims. (Cl. 214—77)

This invention relates to improvements in tailgate platforms adapted for mounting on truck and trailer bodies and more particularly relates to a tailgate platform which will hang vertically when in a raised position.

A principal object of the invention is to provide a tailgate assembly wherein the tailgate platform may hang vertically when in a raised position and in which the tailgate platform may be restored to its open operative position in a simple and efficient manner.

A further object of the invention is to provide a simple and efficient mechanism for automatically restoring a tailgate platform to its open position for lifting loads to the level of a truck floor or to load material thereover.

Another object of the invention is to provide a tailgate assembly, which may be raised from the ground to the level of the floor of a truck or trailer body, in which latch means are provided to hold the platform in a generally horizontal loading position, which latch means are releasable to permit the tailgate platform to be supported in a depending position from the floor of the truck body when loading from a loading platform, and in which a simple means is provided to automatically restore the tailgate platform from a depending inoperative position to an open extended position.

These and other objects of the invention will appear from time to time as the following specification proceeds and with reference to the accompanying drawings wherein:

FIGURE 2 is a bottom fragmentary plan view of the tailgate platform shown in FIGURE 1;

FIGURE 3 is a side elevational view of the platform shown in FIGURE 2;

FIGURE 8 is a diagrammatic view showing the tailgate platform depending from the floor of a truck body;

FIGURE 9 is a diagrammatic view showing the positioning of the tailgate platform to be elevated into a loading position;

FIGURE 10 is a diagrammatic view of the tailgate platform showing the tailgate platform in angularly extending relation with respect to the truck body in position to effect automatic opening of the tailgate platform; and FIGURE 11 is a view showing the tailgate platform in a level position prior to release of the stop lever therefor.

Figure 1:
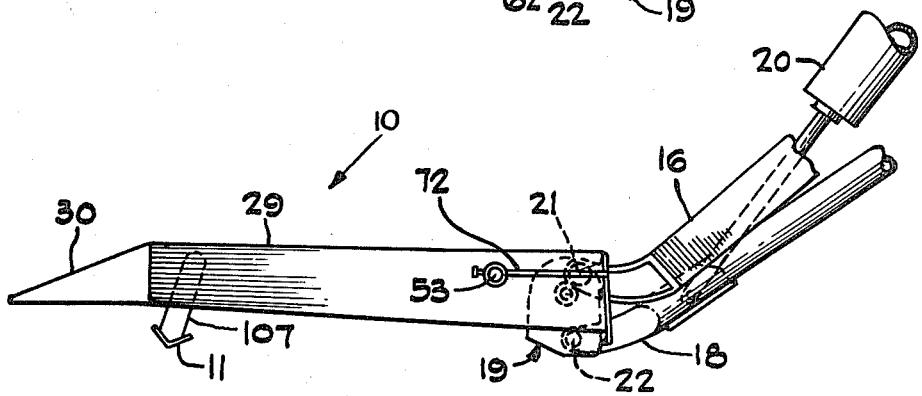
FIGURE 1 is a fragmentary view in side elevation of a tailgate assembly constructed in accordance with the invention, showing the tailgate platform resting on the ground on its skid shoe.

In the embodiment of the invention illustrated in the drawings, FIGURE 1 generally shows a tailgate platform 10 lowered toward the ground and supported at its forward end portion on a skid shoe 11.

The tailgate platform is raised and lowered and supported in elevated and lowered positions by outer arm members 16 and inner arm members 18. The arm members 18 may be telescopic to enable the tailgate platform to extend vertically upwardly from the arm members 16 and 18 when the tailgate platform is in an inoperative position and the truck or trailer carrying the tailgate platform has been loaded or unloaded and is travelling to a new location, in a manner well known to those skilled in the art so not herein shown or described further.

A hydraulic cylinder and piston indicated at 20 is pivotally connected between a tailgate platform support 17 in a conventional manner (not shown), mounted on the body of the truck, and the inner arms 18 to raise and lower the tailgate platform.

The arm members 16, 16 and 18, 18 form in effect a parallelogram linkage arrangement for raising and lowering the tailgate platform 10 in a plurality of parallel planes. The outer arm members 16 are pivotally connected to individual hinge members 19 by pivot pins 21. The inner arm members 18 are pivotally connected to said hinge members by pivot pins 22, shown as being spaced beneath the pivot pins 21 (see FIG. 5).

The arm members 16, 16 are locked in the elevated position shown in FIGURES 9 through 11 by safety lock catches 23 engaging hooked keeper members 26 mounted on and projecting upwardly of the arm members 16. The safety lock catches 23 are of a conventional form and are no part of the present invention so need not herein be shown or described further.

A manual control hand lever 24 is mounted on the support 17 for disengaging the safety lock catches 23 in well-known manner. Through a control shaft 25, the lever 24 is likewise connected to a suitable hydraulic linkage for activating the customary hydraulic system (not shown). Thus, the hand lever 24 functions to control the motions of the hydraulic cylinder and piston 20 in a manner well-known to those versed in the art.

The tail gate platform 10 is shown as being generally in the form of a one piece platform comprising a generally flat plate 29 forming the upper load carrying surface of the platform. The tailgate platform is also shown as having an inclined ramp portion 30 at the rear or outer edge thereof to permit a truck or the like to be readily moved onto said platform, when the platform is in a loading position in engagement with the ground. The ramp portion 30, however, may be eliminated if desired.

Figure 7:
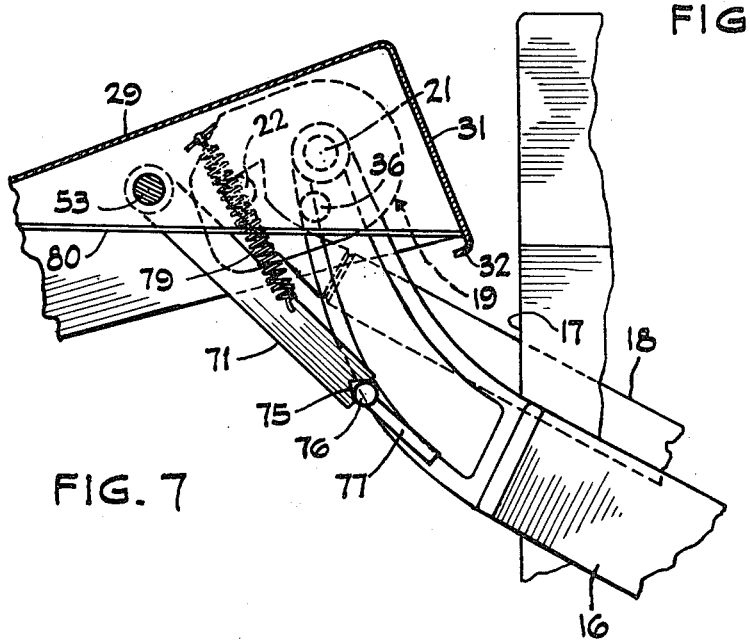
FIGURE 7 is an enlarged general diagrammatic view showing the locking lever in an engaged position with the tailgate platform supported on its latches.

The forward end portion of the tailgate platform, adjacent the body of the truck is shown as in FIGURES 3 and 7 as being bent downwardly at generally right angles to the plate 29 to form a forward wall 31 for the platform 10. The lower end portion of the forward wall 31 is bent inwardly as indicated by reference character 32 to stiffen said wall. The wall 31 and inwardly bent portion 32 thereof are slotted, as indicated by reference characters 33 and 35, to receive the arm members 16 and 18, respectively, and allow relative angular movement of said arm members with respect to the tailgate platform (see FIGS. 3 and 4).

Figure 4:
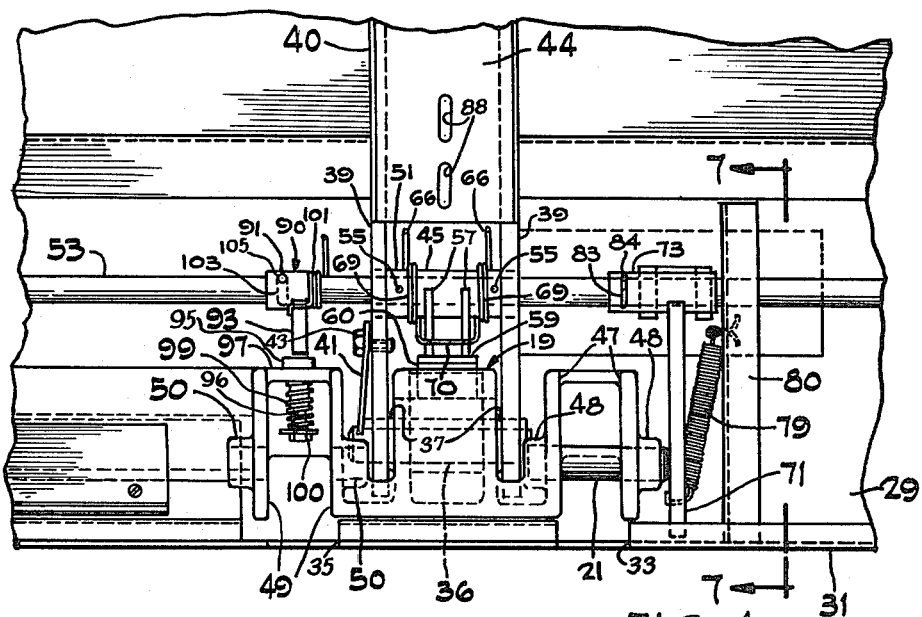
FIGURE 4 is an enlarged fragmentary bottom plan view of the tailgate platform.

Each hinge member 19 is pivotally mounted on the underside of the top plate 29 of the tailgate platform on an individual transvermse pivot pin 36 extending through spaced flanged portions 37 disposed between legs 39 of a beam 40. The pivot pins 36 for the two hinge members are coaxial and extend through and are mounted adjacent their opposite ends on the legs 39 of the beam 40. A locking plate 41 is shown in FIGURE 4 as being secured to an inner leg 39, as by a cap screw 43, and as extending within a slotted portion of a pin 36 to lock said pin in position.

Each beam 40 extends along the underside of the plate 29 and includes the parallel legs 39 connected together by a web 44, extending along the legs 39 toward the forward wall 31, and stopping short of a latch 45, which is adapted to lock the hinge member 19 to the tailgate platform 10 to permit the arm members 16, 16 and 18, 18 to elevate the tailgate platform in a plurality of parallel planes.

The hinge member 19 also has a set of parallel spaced flanges 47 formed integrally therewith and spaced outwardly of the outer leg 39 of the beam 40. The flanges 47 have hollow bosses 48 extending from the outer sides thereof adjacent the top of the hinge member and forming mountings for a transverse pivot pin 21 and thereby forming a connector for an outer arm member 16 to an associated hinge member 19.

The hinge member 19 also has a pair of parallel spaced flanges 49 spaced inwardly of the inner leg 39 of the beam 40 and having aligned hollow bosses 50 extending from the outer sides thereof. The hollow bosses 50 form mountings for a pivot pin 22 connecting an arm member 18 to the associated hinge member 19.

Figure 5:
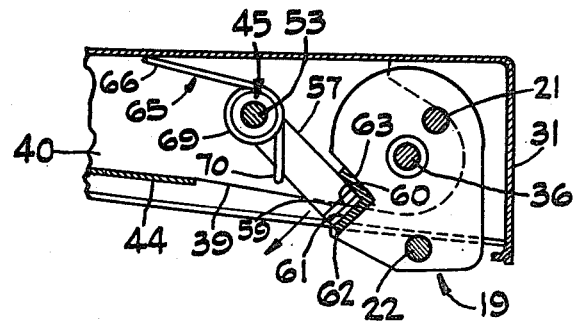
FIGURE 5 is a fragmentary sectional view taken substantially along line 5—5 of FIGURE 2, but rotated 90° in a clockwise direction, and showing one of the latches for retaining the tailgate platform to move in a plurality of generally parallel planes with the supporting hinge members therefor.

Each latch 45, as shown in FIGURES 4 and 5, includes a sleeve 51 mounted on a transverse rock shaft 53 extending for substantially the width of the tailgate platform 10. The sleeve 51 is connected to the shaft 53 as by pins 55 and is shown in FIGURES 2 and 4 as having parallel spaced arms 57 extending radially therefrom, connected together at their outer ends by a plate 59, abutted by an abutment plate 60.

The abutment plate 60 of the latch mechanism 45 is adapted to engage within a latching recess 61, formed by two abutting bars 62 and 63 extending across the hinge member 19 between the flanges 37 thereof. The bar 62 is shown in FIGURE 5 as being inclined upwardly to face the shaft 53 while the bar 63 is shown as being adapted to be abutted by the upper surfaces of the arms 57.

The latch 45 is shown in FIGURES 4 and 5 as being biased upwardly toward the plate 29 to engage the arms 57 with the bar 63 by a torsion spring 65. The torsion spring 65 has spaced legs 66 on opposite sides of the arms 57 and engaging the bottom of the plate 29, and has coiled portions 69 extending therefrom and coiled about the sleeve 51, terminating into a generally U-shaped arm portion 70, extending across the undersides of the arms 57 and thereby biasing the arms 57 and shaft 53 toward the underside of the plate 29 and into engagement with the recess 61.

Hand levers 72 are provided on each end of the shaft 53 to disengage the latch 45 from the recess 61, upon the release of loads from the tailgate platform 10, to thereby permit said tailgate platform to freely pivot about the coaxial hinge pins 36.

Referring now in particular to the locking means which permit the tailgate platform to automatically fold up or open, a stop lever 71 extends radially from a sleeve 73 which is mounted on the shaft 53 for rotatable movement therewith. It will be noted however that the sleeve 73 is capable of limited rotary movement with respect to the shaft 53 for reasons which will become apparent as the description proceeds. The arm 71 is welded or otherwise secured to the sleeve 73, and has a generally V-shaped notch 75 formed in its free end, engageable with a stop pin 76 projecting outwardly of an arm member 16. The stop pin 76 extends along a gusset 77 disposed beneath said stop pin and welded or otherwise secured to an arm 16, and extending outwardly therefrom along the underside of an associated stop pin 76, to reinforce said stop pin and retain said stop pin in laterally extended relation with respect to said arm.

A tension spring 79 is connected between the upper end portion of a gusset plate 80 extending along the bottom of the platform 10 and the stop lever 71. The spring 79 serves to disengage the notch 75 from the stop pin 76 as the latches 45 are engaged and the tailgate platform is moved upwardly toward a closed position, and when the tailgate platform is raised off the latches 45 and lowered into engagement with the ground.

The sleeve 73 has a slot 83 extending circumferentially therealong and accommodating therethrough a pin 84 extending radially from the shaft 53 to permit movement of the shaft 53 to release the latches 45 without moving the stop lever 71 and to then effect movement of the stop lever 71, as the pin 84 picks up the sleeve 73 at the end of the slot 83, to move the stop lever 71 in position to register the notch 75 thereof with the stop pin 76.

Figure 6:
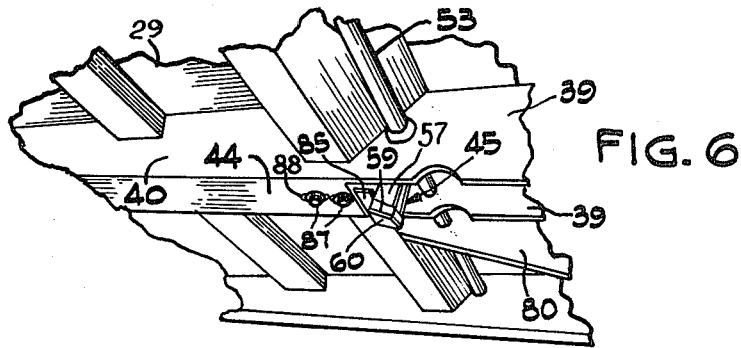
FIGURE 6 is a fragmentary perspective view looking at the tailgate from the bottom thereof in order to show the adjustable stop locating the stop lever in position to effect folding up of the tailgate platform.

A means is provided to locate the notch 75 with relation to a stop pin 76 to enable the notch 75 to engage the stop pin 76, which is shown in FIGURES 2 and 6 as comprising an adjustable stop plate 85 mounted on the underside of a web 44 of a beam 40 and projecting from the forward end portion of said web into position to engage an associated latch member 45 when retracted from its latching recess 61. As shown in FIGURE 2, cap screws 87 extend through elongated slots 88 formed in the web 44, to retain the stop plate 85 in a selected position of adjustment with respect to the web 44 and latch 45, to properly position the stop lever as the latch arms 57 are in their extreme released positions.

A safety latch 90 is also provided on the shaft 53, to prevent operation of the hand lever 72 to release the latches 45 when the tailgate is in an upwardly extending closed position, extending upwardly along the back of the vehicle body. The safety latch 90 is shown in FIGURES 2 and 4 as comprising a sleeve 91 mounted on the shaft 53 and having a latch arm 93 extending radially therefrom adapted to engage a head 95 on the end of a plunger 96, slidably mounted in a rear end wall 97, connected between the two parallel spaced flanges 49 of the hinge member 19. A spring 99 is sealed on the forward side of the wall 97 and encircles the plunger 96 and is retained to said plunger as by a nut and washer 100. The spring 99 thus biases the head 95 of the plunger 96 into engagement with the rear face of the wall 97. As the tailgate platform is moved vertically to its upwardly extending closed position, the associated arm member 18 will engage the nut on the end of the plunger 96 and move said plunger outwardly or rearwardly of the wall 97, to intersect the path of travel of the latch arm 93 and prevent operation of the shaft 53 to release the latch 45 when the tailgate platform is in its closed position, and thereby prevent accidental release and dropping of the platform.

A torsion spring 101 is provided to bias the latch arm 93 and the end of a slot 103 in the sleeve 91 into engagement with a pin 105, extending radially outwardly of the shaft 53. Thus upon movement of the shaft 53 in a direction to release the latches 45, the latch arm 93 will move with said shaft, but when the tailgate platform is in a closed position, the head 95 of the plunger 96 will hold the shaft 53 from movement in a direction to release the latch 45.

The skid shoe 11 movable to support the forward end portion of the tailgate platform in position to take the load from the latches 45 and to thereby permit release of the latches 45 is shown as being mounted on the outer ends of parallel spaced arms 107, pivotally mounted to the underside of the plate 29 on a transverse pivot pin 109, extending through the arms 107 and a boss 110 extending between said arms and depending from the bottom of the plate 29.

A spring clip 111 suitably secured to and depending from the bottom of the plate 29 is provided to hold the skid shoe 11 in retracted relation with respect to the tailgate platform 10. As shown in FIGURE 3, the spring clip 111 is clipped about opposite sides of a reinforcing rod 112 extending across the arms 107 and welded or otherwise secured thereto.

During normal operation of the tailgate, the skid shoe 11 is clipped in a retracted position shown in FIGURE 3. When, however, it is desired to fold up the tailgate platform, the skid shoe 11 is manually released from the spring clip 111 and moved outwardly beneath the bottom of the tailgate platform into engagement with a cross brace 113 extending across the tailgate platform to support the tailgate platform above the ground for slidable movement therealong, and relieve the loads on the latches 45, so they may be released to allow the tailgate to be folded up.

In order to release the tailgate platform so it will fold up when the arms 16, 16 and 18, 18 are in an elevated position, the skid shoe 11 is pulled out and the tailgate platform is lowered to engage said skid shoe with the ground. The lever 72 may then be pressed down by the foot to release the latches 45, 45. The platform may then be raised partially by operation of the arm members 16, 16 and 18, 18 to assure the latches 45 remain in their released positions. The foot may then be removed from the lever 72 and the raising of the arms 16, 16 and 18, 18 may be continued until the keepers 26 engage and are locked into engagement with the safety lock catches 23. The platform will then depend from the arms 16 and 18 and the truck may be backed up to a loading platform, the forward wall 31 of the platform carrying the load of a hand truck or any other type of truck being used to load the truck and being on a level with the floor of the truck body, as shown in FIGURE 8.

When it is desired to raise the platform from a depending position to a loading position, the safety lock catches 23 are maintained in latching engagement with the keepers 26 to support the arms 16, 16 in the position shown in FIGURE 9. The hand lever 24 is moved in a counter-clockwise direction from a central position to the solid line position shown in FIGURE 9. This will raise the tailgate platform to the dotted line position shown in FIGURE 9.

The lever 72 may then be moved into its down position shown in FIGURE 9. This will move the latches 45 to engage one latch member with the stop plate 85 and locate the notch 75 with respect to the stop pin 76. The hand lever 24 may then be turned in a clockwise direction towards position A, while holding the lever 72 down by the hand until the notch 75 engages the lock pin 76. The tailgate platform will then be supported in the angularly extended position shown in FIGURE 10. With the latch members 23 supporting the arms 16, the hand lever 24 when turned in a clockwise direction to position "A" will effect the pivoting of the hinge members 19 in a counter-clockwise direction about the axes of the coaxial pivot pins 21. Because the lever 71 is in engagement with the stationary pin 76, supporting the tailgate platform thereon, and due to the relative positions of the lever shaft 53 and hinge shaft 36 with respect to the pins 21 an additional raising action is achieved as the hinge member 19 moves in a counter-clockwise direction raising the tailgate platform into the horizontal position shown in FIGURE 11. When the platform attains a level position, the torsion springs 65 will snap the latches 45 in position to engage the abutment pads 60 with the recesses 61 in the hinge members 19. The handle 72 will also snap to the horizontal position shown in FIGURE 11. The control handle 24 may be maintained in the solid line position shown in FIGURE 11, to partially close the tailgate and allow the gate stop lever 71 to free itself from the stop pin 76. The tailgate platform is now in position for loading.

While I have herein shown and described one form in which my invention may be embodied, it may readily be understood that various variations and modifications in the invention may be attained without departing from the spirit and scope of the novel concepts thereof.

I claim as my invention:

1. In a tail gate assembly adapted to be mounted on a vehicle body, a lift platform, elevating means for raising and lowering said platform, a hinge member mounted on said elevating means and movable vertically thereby, means pivotally mounting said platform on said hinge member for pivotal movement about said hinge member, latch means on said platform cooperating with said hinge member to latch said platform in immovable relationship with respect to said hinge member, said latch means being releasable to permit said platform to hang vertically downwardly when said hinge member is in a raised position, and releasable stop means on said platform and said elevating means cooperating to support the load of said platform on said elevating means whereby said latch means may be engaged with said hinge member to restore said platform to said immovable relationship.

2. In a tail gate assembly a support adapted to be mounted on a vehicle body, a pair of spaced arms connected to said support and pivotal about a transverse axis, a tail gate platform, means mounting said platform on said arms comprising at least one hinge member mounted on the free ends of said arms and at least one pivot pin mounting said platform on said hinge member for pivotal movement about an axis parallel to said transverse axis, power means for moving said arms and platform to elevate and lower said platform, latch means on said platform cooperating with said hinge member to latch said platform in immovable relationship with respect to said hinge member, said latch means being releasable to permit said platform to hang vertically downwardly when said hinge member is in a raised position, and releasable stop means on said platform and one of said arms cooperating to support the load of said platform on said one arm when said latch means are released, thereby permitting re-engagement of said latch means to restore said platform to said immovable relationship.

3. In a tail gate assembly, a support adapted to be mounted on a truck body, a tain gate platform, a pair of arms connected to said support and pivotal about spaced parallel axes, a hinge member, spaced parallel pivot pins connecting said arms to said hinge member, a hinge pin mounting said platform on said hinge member for pivotal movement about an axis parallel to said pivot pins, latch means on said platform cooperating with said hinge member to latch said platform in immovable relationship with respect to said hinge member, said latch means being releasable to permit said platform to depend from said arms when said arms are in a raised position, means releasably locking one of said arms in a raised position so that the other of said arms is permitted to pivot said platform and hinge member about the pivot pin connecting said one arm to said hinge member, and releasable stop means between said platform and arms positionable to transfer the weight of said platform onto one of said arms upon release of said latch means so that pivotal movement of said platform and hinge member permits engagement of said latch means.

4. In a tail gate assembly, a support adapted to be mounted on a truck body, a tail gate platform, a pair of arms connected to said support for pivotal movement about transverse, spaced parallel axes, a hinge member, spaced parallel pivot pins connecting said arms to said hinge member, a hinge pin mounting said platform on said hinge member for pivotal movement about an axis parallel to said pivot pins, latch means on said platform engageable with said hinge member to latch said platform in immovable relationship with respect to said hinge member, said latch means being releasable to permit said platform to depend from said arms when said arms are in a raised position, means releasably locking one of said arms in a raised position to permit the other of said arms to pivot said platform and hinge member about the pivot pin connecting said one arm to said hinge member, releasable stop means on said platform and one arm for transferring the weight of said platform to said one arm upon release of said latch means so that pivotal movement of said platform and hinge member will effect engagement of said latch means, and a hand lever on said platform for releasing said latch means and automatically positioning said stop means to support said platform on said one arm.

5. In a tail gate assembly, a support adapted to be mounted on a truck body, a tail gate platform, a pair of arms connected to said support for pivotal movement about transverse, spaced parallel axes, a hinge member, spaced parallel pivot pins connecting said arms to said hinge member, a hinge pin mounting said platform on said hinge member for pivotal movement about an axis parallel to said pivot pins, latch means on said platform engageable with said hinge member to latch said platform in immovable relationship with respect to said hinge member, said latch means being releasable to permit said platform to depend from said arms when said arms are in a raised position, means releasably locking one of said arms in a raised position to permit the other of said arms to pivot said platform and hinge member about the pivot pin connecting said one arm to said hinge member, releasable stop means on said platform and one arm for supporting the weight of said platform on said one arm upon release of said latch means so that pivotal movement of said platform and hinge member will effect engagement of said latch means and simultaneous release of said stop means, a hand lever on said platform for releasing said latch means and atuomatically positioning said stop means to support said platform on said one arm, and a stop member on said platform limiting movement of said latch means in a release direction and automatically positioning said stop member to transfer the weight of said platform to said one arm.

6. In a tail gate assembly, a support adapted to be mounted on a truck body, a tail gate platform, a pair of arms connected to said support for pivotal movement about transverse, spaced parallel axes, a hinge member, spaced parallel pivot pins connecting said arms to said hinge member, a hinge pin mounting said platform on said hinge member for pivotal movement about an axis parallel to said pivot pins, latch means engageable with said hinge member to latch said platform in immovable relationship with said hinge member and releasable to permit said platform to depend from said arms when said arms are in a raised position, means releasably locking one of said arms in a raised position to permit the other of said arms to pivot said platform and hinge about the pivot pin connecting said one arm to said hinge member, an abutment member on said one arm, a pivoted stop lever on said platform engageable with said abutment member to support the weight of said platform on said one arm and permit said latch means to come into latching engagement with said hinge member upon relative movement between said hinge member and platform.

7. The tail gate assembly of claim 6 in which first spring means bias said latch means into latching engagement with said hinge member, second spring means bias said stop lever out of registry with said abutment member and a hand lever for releasing said latch means from engagement with said hinge member and simultaneously moving said stop lever into registry with said abutment member.

8. The tail gate assembly of claim 7 in which a stop member is positioned on said platform, said stop member limiting movement of said latch means in a release direction and automatically locating said stop lever into registry wtih said abutment member.

9. In a tailgate assembly,
a support adapted for mounting on a truck body,
a tailgate platform,
a pair of arms transversely pivoted to said support for movement about spaced parallel axes,
a hinge member,
spaced parallel pivot pins connecting said arms with said hinge member,
a hinge pin mounting said platform on said hinge member for movement about an axis parallel to the axis of pivotal connection of said hinge member to said arms,
means holding one of said arms from vertical movement whereby the other of said arms will pivot said platform about the axis of connection of said one arm to said hinge member,
a releasable latch member pivotally mounted on said tailgate platform for engagement with said hinge member for retaining said platform from movement about the axis of said hinge member,
a platform stop lever pivotally mounted beneath said platform,
a stop member on one of said arms engageable by said stop lever for retaining said platform in fixed angular relation with respect to said arms,
and a common hand lever for releasing said latch member and moving said stop lever into position to engage said stop member.

10. In a tail gate assembly, a support adapted to be mounted on a vehicle body, a pair of arms pivotally connected to said support, a tail gate platform mounted on said arms, means mounting said platform on said arms comprising at least one hinge member mounted on the free ends of said arms and at least one pivot pin pivotally connecting said platform to said hinge member, power means for moving said arms and platform vertically to elevate and lower said platform in a plurality of parallel planes and to move said platform into a vertical upright position, latch means on said platform cooperable with said hinge member to latch said platform into immovable relationship with respect to said hinge member, a transverse shaft pivotally mounted on said platform and movable to release said latch means, a locking lever on said shaft, and a plunger on said platform movable to intersect the path of movement of said locking lever and thereby prevent movement of said shaft to release said latch means when said platform is in the vertical upright position.

11. The tail gate assembly of claim 10 in which spring means normally urge said plunger out of the path of movement of said locking lever, and means on one of said arms for moving said plunger into the path of movement of said locking lever when said platform is moved into the vertical upright position.

12. In a tailgate assembly,
a tailgate platform,
a support adapted for mounting on a truck body,
a pair of spaced arms adjacent each side of said support and pivotally mounted thereon for movement about parallel vertically spaced axes,
a hinge member pivotally attached to each pair of arms,
vertically spaced pivot pins connecting said pairs of arms with said hinge member,
power means operatively connected with said arms for moving said arms and hinge member vertically,
coaxial transverse pivot pins pivotally connecting said platform to said hinge members,
a transverse rock shaft pivotally mounted on said platform beneath the top thereof,
a hand lever positioned on said platform for rocking said shaft,
spaced latch members on said rock shaft engageable with said hinge members to retain said platform and hinge members to move vertically as a unit,
spring means biasing said latch members in a latching direction, an abutment member on one of said arms,
a stop lever mounted on said rock shaft for relative movement with respect thereto and for movement therewith,
whereby movement of said rock shaft in a direction to release said latch members will move said stop lever into position to engage said abutment member upon release of said latch member,
and spring means connected with said stop lever and moving said stop lever out of position to register with said abutment member.

13. In a tailgate assembly,
a tailgate platform,
a support adapted for mounting on a truck body,
a pair of spaced arms adjacent each side of said support and pivotally mounted thereon for movement about parallel vertically spaced axes,
a hinge member pivotally attached to each pair of arms,
vertically spaced pivot pins connecting said pairs of arms with said hinge member,
power means operatively connected with said arms for moving said arms and hinge member vertically,
coaxial transverse pivot pins pivotally connecting said platform to said hinge members,
a transverse rock shaft pivotally mounted on said platform beneath the top thereof,
a hand lever positioned on said platform for rocking said shaft,
spaced latch members on said rock shaft engageable with said hinge members to retain said platform and hinge members to move vertically as a unit,
spring means biasing said latch members in a latching direction,
an abutment member on one of said arms,
a stop lever mounted on said rock shaft for relative movement with respect thereto and for movement therewith,
whereby movement of said rock shaft in a direction to release said latch members will move said stop lever into position to engage said abutment member upon release of said latch member,
spring means connected with said stop lever and moving said stop lever out of position to register with said abutment member,
and a stop member on said platform limiting movement of said latch members in a release direction and registering said stop lever to engage said abutment member to take the load of the platform on the associated arm.

References Cited by the Examiner
UNITED STATES PATENTS

| | | |
|---|---|---|
| 2,469,321 | 5/49 | Wood. |
| 2,593,240 | 4/52 | Anthony et al. _____ 296–57.1 X |
| 3,065,868 | 11/62 | Novotney. |
| 3,065,869 | 11/62 | Mathers et al. |

HUGO O. SCHULZ, *Primary Examiner.*

GERALD M. FORLENZA, *Examiner.*